(12) United States Patent
Tang et al.

(10) Patent No.: US 11,804,928 B2
(45) Date of Patent: Oct. 31, 2023

(54) DATA TRANSMISSION METHOD, DEVICE AND COMPUTER STORAGE MEDIUM

(71) Applicant: GUANGDONG OPPO MOBILE TELECOMMUNICATIONS CORP., LTD., Dongguan (CN)

(72) Inventors: Hai Tang, Dongguan (CN); Huei-Ming Lin, Victoria (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/940,265

(22) Filed: Jul. 27, 2020

(65) Prior Publication Data

US 2020/0366421 A1    Nov. 19, 2020

Related U.S. Application Data

(63) Continuation of application No. PCT/CN2018/122888, filed on Dec. 21, 2018.

(30) Foreign Application Priority Data

Feb. 6, 2018  (WO) ............... PCT/CN2018/075454

(51) Int. Cl.
*H04L 1/1812* (2023.01)
*H04W 4/40* (2018.01)
(Continued)

(52) U.S. Cl.
CPC ............ *H04L 1/1816* (2013.01); *H04W 4/40* (2018.02); *H04W 28/04* (2013.01); *H04W 92/18* (2013.01)

(58) Field of Classification Search
CPC ... H04L 1/1867; H04L 1/1825; H04L 1/1816; H04L 1/1896; H04L 1/188; H04W 28/04; H04W 4/40; H04W 92/18
See application file for complete search history.

(56) References Cited

U.S. PATENT DOCUMENTS

2013/0322413 A1* 12/2013 Pelletier ............... H04W 72/20
                                                        370/336
2016/0056940 A1*  2/2016 Chae .................... H04L 5/0055
                                                        370/312
(Continued)

FOREIGN PATENT DOCUMENTS

CN      101005691 A     7/2007
CN      101388756 A     3/2009
(Continued)

OTHER PUBLICATIONS

"New SID: Study on NR V2X", Agenda Item: 9.1.5, Source: Vodafone, 3GPP TSG RAN Meeting #80, RP-181480, La Jolla, USA, Jun. 11-14, 2018, 5 pages.
(Continued)

*Primary Examiner* — Oussama Roudani
(74) *Attorney, Agent, or Firm* — BAYES PLLC

(57) ABSTRACT

A method for data transmission, applied to a transmitting end user equipment (UE), includes acquiring an indication with respect to a logical channel; determining a hybrid automatic repeat request (HARQ) retransmission without requiring feedback or requiring feedback of data to be transmitted based on the indication with respect to the logical channel on HARQ retransmission of the data to be transmitted; and transmitting, according to the HARQ retransmission mode, the data to be transmitted to a receiving end UE.

11 Claims, 6 Drawing Sheets

(51) Int. Cl.
*H04W 28/04* (2009.01)
*H04W 92/18* (2009.01)

(56) References Cited

U.S. PATENT DOCUMENTS

| | | | | |
|---|---|---|---|---|
| 2016/0135143 | A1* | 5/2016 | Won | H04W 12/08 370/312 |
| 2017/0188312 | A1* | 6/2017 | Wang | H04W 52/367 |
| 2017/0257192 | A1* | 9/2017 | Wang | H04L 1/189 |
| 2017/0289995 | A1* | 10/2017 | Lin | H04W 72/0446 |
| 2018/0324641 | A1* | 11/2018 | Tsai | H04W 36/0069 |
| 2019/0052436 | A1* | 2/2019 | Desai | H04L 5/0053 |
| 2019/0103946 | A1* | 4/2019 | Li | H04L 1/1887 |
| 2019/0124015 | A1* | 4/2019 | Loehr | H04L 69/321 |
| 2021/0176774 | A1* | 6/2021 | Feng et al. | H04W 72/1263 |

FOREIGN PATENT DOCUMENTS

| | | |
|---|---|---|
| CN | 103220091 A | 7/2013 |
| CN | 103368706 A | 10/2013 |
| CN | 103546254 A | 1/2014 |
| CN | 103856301 A | 6/2014 |
| CN | 106559877 A | 4/2017 |
| CN | 107006025 A | 8/2017 |
| CN | 107231658 A | 10/2017 |
| EP | 3 206 321 A1 | 8/2017 |
| EP | 3 273 634 A1 | 1/2018 |
| WO | 2014110790 A1 | 7/2014 |
| WO | 2014117391 A1 | 8/2014 |
| WO | 2017/063697 A1 | 4/2017 |
| WO | 2019153125 A1 | 8/2019 |
| WO | 2019153911 A1 | 8/2019 |

OTHER PUBLICATIONS

Supplementary European Search Report issued in corresponding European Application No. EP 18 90 5094, dated Feb. 8, 2021, 9 pages.
The First Office action issued in corresponding Chinese Application No. 202010891827.1, dated Aug. 31, 2021, 19 pages.
Communication Pursuant to Article 94(3)EPC issued in corresponding European Application No. 18905094.1, dated Oct. 5, 2021, 6 pages.
Second Office action issued in corresponding Chinese Application No. 202010891827.1, dated Dec. 7, 2021, 15 pages.
First Office action issued in corresponding India Application No. 202027032353, dated Feb. 22, 2022, 5 pages.
"Corrections to V2X functionality", Source to WG: LG Electronics Inc., 3GPP TSG-RAN WG2 Meeting #99bis, R2-1711852, Prague, Czech, Oct. 9-13, 2017, 17 pages.
Third Office Action issued in corresponding Chinese Application No. 202010891827.1, dated Apr. 6, 2022, 19 pages.
"HARQ for autonomous uplink access", Source: Nokia, Nokia Shanghai Bell, 3GPP TSG-RAN WG1 Meeting #90, R1-1713860, Prague, Czech Republic, Aug. 21-25, 2017, 3 pages.
Hearing Notice issued in corresponding Indian Application No. 202027032353, dated Apr. 20, 2023.

* cited by examiner

DATA TRANSMISSION METHOD, DEVICE AND COMPUTER STORAGE MEDIUM

CROSS-REFERENCE TO RELATED APPLICATIONS

This application is a continuation of International Application No. PCT/CN2018/122888, filed on Dec. 21, 2018, which claims the benefit of priority to International Application No. PCT/CN2018/075454, filed on Feb. 6, 2018, both of which are hereby incorporated by reference in their entireties.

BACKGROUND

The present application relates to the field of wireless communications technologies, and in particular, to a method and a device for data transmission, and a computer storage medium.

The vehicle networking system adopts device-to-device (D2D) sidelink (SL) transmission technology based on long term evolution (LTE). Different from the conventional LTE system, in which the communication data is received or sent via the base station, the vehicle networking system adopts a terminal-to-terminal direct communication manner, thereby having higher spectral efficiency and lower transmission delay.

In the 3rd Generation Partnership Project (3GPP) Rel-14, the vehicle-to-everything (V2X) technology was standardized, in which two transmission modes were defined: mode 3 and mode 4. In mode 3, the transmission resources of the terminal are allocated by the base station. In mode 4, the terminal determines the transmission resources by means of sensing and reservation.

In the current V2X system, the hybrid automatic repeat request (HARQ) mechanism based on the feedback from the receiver is not supported. Therefore, for the V2X technology, the data transmission based on the HARQ mechanism is a problem needed to be solved.

SUMMARY

Embodiments of the present application provide a method and a device for data transmission, and a computer storage medium.

The technical solution of the embodiments of the present application can be implemented as follows.

According to a first aspect of the embodiments of the present application, there is provided a method for data transmission, applied to a transmitting end user equipment (UE), the method including determining a hybrid automatic repeat request (HARQ) retransmission mode of data to be transmitted based on configuration information on HARQ retransmission of the data to be transmitted; and transmitting, according to the HARQ retransmission mode, the data to be transmitted to a receiving end UE.

According to a second aspect of the embodiments of the present application, there is provided a method for data transmission, applied to a receiving end UE, the method including receiving a HARQ transmission mode of data to be transmitted sent from a transmitting end UE; and receiving, based on the HARQ transmission mode of the data to be transmitted, HARQ retransmission data of the data to be transmitted.

According to a third aspect of the embodiments of the present application, there is provided a method for data transmission, applied to a network side device, the method including sending configuration information to a transmitting end UE; wherein the configuration information is used by the transmitting end UE to determine a HARQ retransmission mode of data to be transmitted.

According to a fourth aspect of the embodiments of the present application, there is provided a transmitting end UE, including a determination part and a transmission part, wherein the determination part is configured to determine a HARQ retransmission mode of data to be transmitted based on configuration information on HARQ retransmission of the data to be transmitted; and the transmission part is configured to transmit, according to the HARQ retransmission mode, the data to be transmitted to a receiving end UE.

According to a fifth aspect of the embodiments of the present application, there is provided a receiving end UE, including a second receiving part and a third receiving part, wherein the second receiving part is configured to receive a HARQ transmission mode of data to be transmitted sent from a transmitting end UE; and the third receiving part is configured to receive, based on the HARQ transmission mode of the data to be transmitted, HARQ retransmission data of the data to be transmitted.

According to a sixth aspect of the embodiments of the present application, there is provided a network side device, including a sending part configured to send configuration information to a transmitting end UE; wherein the configuration information is used for determining a HARQ retransmission mode of data to be transmitted.

According to a seven aspect of the embodiments of the present application, there is provided a transmitting end UE, including a first network interface, a first memory and a first processor; wherein the first network interface is configured to receive and send signals during a process of transceiving information with another external network element; the first memory is configured to store a computer program capable of running on the first processor; the first processor, when running the computer program, is configured to perform steps of the method according to the first aspect.

According to an eighth aspect of the embodiments of the present application, there is provided a receiving end UE, including a second network interface, a second memory and a second processor; wherein
the second network inter ace is configured to receive and send signals during a process of transceiving information with another external network element; the second memory is configured to store a computer program capable of running on the second processor; the second processor, when running the computer program, is configured to perform steps of the method according to the second aspect.

According to a ninth aspect of the embodiments of the present application, there is provided a network side device, including a third network interface, a third memory and a third processor; wherein the third network interface is configured to receive and send signals during a process of transceiving information with another external network element; the third memory is configured to store a computer program capable of running on the third processor; the third processor, when running the computer program, is configured to perform steps of the method according to the third aspect.

According to a tenth aspect of the embodiments of the present application, there is provided a computer storage medium storing a data transmission program, the data transmission program being executed by at least one processor to implement steps of the method according to the first aspect or the second aspect or the third aspect.

The embodiments of the present application provide a method and a device for data transmission, and a computer storage medium. In the technical solution according to the embodiments of the present application, the HARQ retransmission mode of the data to be transmitted is determined based on the configuration information, and transmission of the data to be transmitted is performed according to the HARQ retransmission mode, thereby implementing data transmission based on the HARQ mechanism for the V2X technology. It is not necessary to adopt HARQ retransmission for all data to be transmitted, thereby avoiding waste of channel resources and achieving a balance between channel resource utilization and correct receiving rate of transmitted data.

DETAILED DESCRIPTION

The embodiments of the present disclosure are described in detail below with reference to the accompanying drawings.

To facilitate understanding of the technical solutions of the embodiments of the present disclosure, modes 3 and 4 in V2X are separately explained below.

Figure 1:
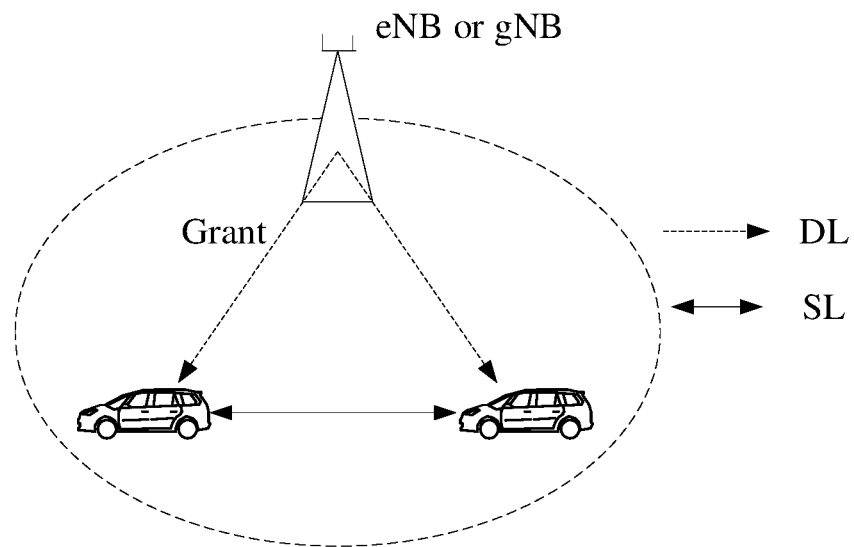
FIG. 1 is a schematic diagram illustrating a scenario of mode 3 in V2X.

For mode 3, as shown in FIG. 1, the transmission resource of an in-vehicle terminal is allocated by a base station, such as an evolved NodeB (eNB) in LTE or a 5G base station (gNB) in the new radio (NR). Specifically, the base station sends a control message for indicating the grant resource to the in-vehicle terminal through a downlink (DL); and then, the in-vehicle terminal performs data transmission on SL according to the resource allocated by the base station. In mode 3, the base station may allocate a single transmission resource for the vehicle terminal or may allocate a semi-static transmission resource for the terminal.

Figure 2:
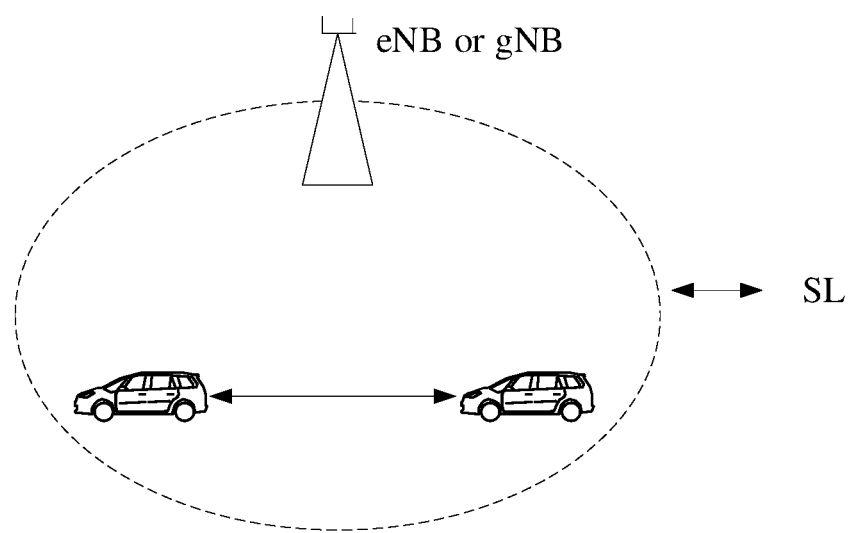
FIG. 2 is a schematic diagram illustrating a scenario of mode 4 in V2X.

For mode 4, as shown in FIG. 2, the vehicle terminal adopts a transmission manner of sensing and reservation. The vehicle terminal acquires an available transmission resource set in a resource pool by means of sensing, and randomly selects one resource from the transmission resource set for data transmission. Since the service in V2X system has periodic characteristics, the vehicle terminal usually adopts a semi-static transmission manner. In other words, after the vehicle terminal selects one transmission resource, the resource is continuously used in multiple transmission cycles, thereby reducing the probability of the resource re-selection and resource conflict. The vehicle terminal carries information for reserving the next transmission resource in the control information of the current transmission, so that other terminals can determine whether the resource is reserved and used by the vehicle terminal by detecting the control information of the vehicle terminal, thereby achieving the purpose of reducing resource conflicts.

For the exemplary description of the above two modes, in the V2X technology, after the transmitting end performs data transmission, the number of receiving ends that receive the transmitted data may be more than one, that is, the data transmission scenario may be that the transmitted data is multicast. In this scenario, if it is to implement data transmission based on the HARQ mechanism, the transmitting end needs to perform retransmission as long as any one receiving end does not receive the correct transmission data. This causes a great cost on channel resources.

Therefore, how to achieve a balance between channel resource utilization and correct reception rate of transmitted data is an issue in implementing data transmission based on HARQ mechanism in V2X technology. In response to this issue, the embodiments of the present disclosure are illustrated and described by the following embodiments.

It can be understood that all the technical solutions of the embodiments of the present disclosure are applicable not only to the V2X system, but also to other end-to-end communication systems. The terminal in the embodiments of the present disclosure may be an in-vehicle terminal, a handheld terminal, a PDA (Personal Digital Assistant), a wearable terminal and the like, and the network in the embodiments of the present disclosure may be an NR network, an LTE network and the like.

Embodiment I

Figure 3:
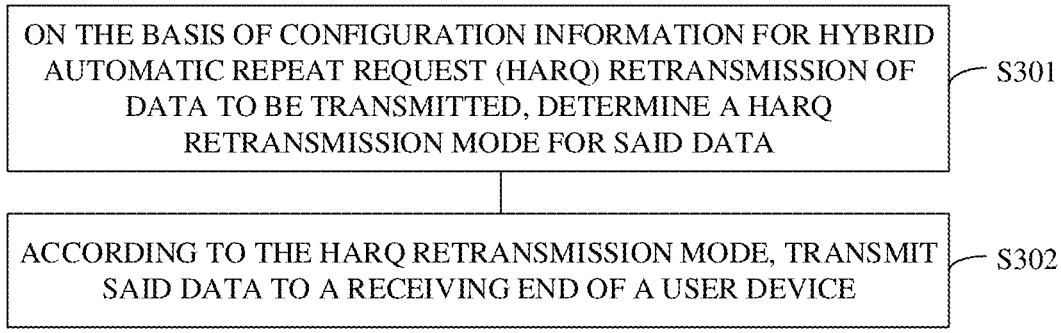
FIG. 3 is a schematic flowchart illustrating the method for data transmission according to an embodiment of the present disclosure.

Referring to FIG. 3, the method for data transmission according to an embodiment of the present disclosure is shown. The method may be applied to a transmitting end user equipment (UE), and the method may include the following steps.

In S301, a HARQ retransmission mode of data to be transmitted is determined according to configuration information of a hybrid automatic repeat request (HARQ) retransmission of the data to be transmitted.

In S302, the data to be transmitted is transmitted to a receiving end UE according to the HARQ retransmission mode.

Through the technical solution shown in FIG. 3, at the transmitting end UE, the HARQ retransmission mode of the data to be transmitted is determined based on the configuration information, and the data to be transmitted is transmitted according to the HARQ retransmission mode, so that it is not necessary to adopt HARQ retransmission for all data to be transmitted, thereby avoiding waste of channel resources, and achieving the balance between channel resource utilization and correct receiving rate of transmitted data.

Specifically, the HARQ retransmission mode may include performing HARQ retransmission for data to be transmitted or not performing HARQ retransmission for data to be transmitted. Based on this, for a technical solution shown in FIG. 3, in a possible implementation, the determining the HARQ retransmission mode of the data to be transmitted based on configuration information on HARQ retransmission of the data to be transmitted includes: receiving the configuration information; and determining, according to the configuration information, whether HARQ retransmission needs to be performed for the data to be transmitted.

For the foregoing implementation, the configuration information may be sent by a network side device other than the transmitting end UE in the network to the transmitting end UE or may be pre-configured in the transmitting end UE. If the configuration information is sent by the network side device other than the transmitting end UE, in an exemplary implementation, the configuration information may be determined by a high layer device of the network protocol layer based on requirement information as pre-defined and sent to the transmitting end UE. Alternatively, the configuration information may be determined by an access network device based on a condition that the HARQ retransmission needs to be performed and sent to the transmitting end UE, which is not detailed in the embodiments.

It should be noted that the configuration information may be specifically used for representing a determination rule for determining whether to perform the HARQ retransmission, so that the transmitting end UE can perform determination for all the data to be transmitted according to the determination rule. Based on the determination result, the transmitting end UE can determine whether to perform HARQ retransmission for a certain piece or a certain type of data to be transmitted and also can determine whether the HARQ retransmission is not performed for a certain piece or a certain type of data to be transmitted.

Optionally, based on the determination rule represented by the configuration information, the configuration information may include an indication that HARQ retransmission needs to be performed for a target service, or an indication that HARQ retransmission needs to be performed for a target address. Correspondingly, the determining, according to the configuration information, whether HARQ retransmission needs to be performed for the data to be transmitted in the forgoing implementation may include detecting whether an indication that HARQ retransmission needs to be performed for a target service or an indication that HARQ retransmission needs to be performed for a target address is included in the data to be transmitted; determining, if yes, to perform HARQ retransmission for the data to be transmitted; and determining, if no, not to perform HAQR retransmission for the data to be transmitted.

In the foregoing optional example, the determination rule represented by the configuration information may be described based on attribute information of the data to be transmitted corresponding to a specific service requirement. For example, when the transmitting end UE sends the data to be transmitted, an indication information field or a byte may be added into the data structure of the data to be transmitted, indicating that HARQ retransmission needs to be performed for the target service or the target address of the data to be transmitted. Therefore, whether the data to be transmitted includes therein HARQ retransmission needs to be performed for a target service or an indication that HARQ retransmission needs to be performed for a target address may be detected to determine whether to perform HARQ retransmission for the data to be transmitted.

Optionally, based on the determination rule represented by the configuration information, the configuration information may also include reliability description information on that HARQ retransmission needs to be performed for a target address or a target service. Correspondingly, the determining, according to the configuration information, whether the HARQ retransmission needs to be performed for the data to be transmitted in the forgoing implementation may include detecting whether reliability requirement of the data to be transmitted meets the reliability description information on that HARQ retransmission needs to be performed for a target address or a target service; determining, if yes, to perform HARQ retransmission for the data to be transmitted; and determining, if no, not to perform HARQ retransmission for the data to be transmitted.

In the above optional example, the determination rule represented by the configuration information is described based on the reliability requirement. Therefore, it is possible to detect whether the reliability requirement of the data to be transmitted meets the reliability description information on that HARQ retransmission needs to be performed for a target address or a target service. For the reliability description information in an exemplary implementation, it may be a specific reliability requirement of the data to be transmitted, for example, the bit error rate is lower than a reliability threshold as predefined, the transmission success rate is higher than a reliability threshold as predefined, and the like. In such case, the transmitting end UE may perform HARQ retransmission in order to achieve the transmission reliability of the data to be transmitted for a specific service or a specific target address. For example, when a vehicle where the transmitting end UE is located is faulty and an alarm is generated, since the travel of other vehicles in V2X may be affected, data transmission of the alarm service requires high reliability requirement. Accordingly, when the data to be transmitted at the transmitting end UE is the alarm information, the reliability requirement for data transmission of the alarm service may be set that the error rate is less than 1%, and the reliability threshold of error rate may be set as 5%. Therefore, HARQ retransmission needs to be performed for transmission of the alarm information. For another example, when a target of data transmission is used as a data relay node, based on the importance of the relay node in the data transmission in V2X, a high reliability requirement is required for the data transmitted to the relay node, then the transmission success rate of the data to be transmitted may be set as higher than 99%, and the transmission success threshold may be set as 95%. Therefore, when the transmitting end UE sends the data to be transmitted to the relay node, based on that the target address of the data to be transmitted is the relay node, HARQ retransmission is required for the data to be transmitted. It should be understood that the determination rule represented by the configuration information can also be described based on the attribute information corresponding to other service requirements, which is not detailed in this embodiment.

Optionally, based on the determining rule represented by the configuration information, the configuration information may include a network environment indicator threshold corresponding to a situation where HARQ retransmission needs to be performed. Correspondingly, the determining, according to the configuration information, whether the HARQ retransmission needs to be performed for the data to be transmitted in the forgoing implementation may include detecting whether a network environment indicator value when the data to be transmitted is sent exceeds the network environment indicator threshold corresponding to the situation where HARQ retransmission needs to be performed; determining, if yes, to perform HARQ retransmission for the data to be transmitted; and determining, if no, not to perform HAQR retransmission for the data to be transmitted.

In the foregoing optional example, the determination rule represented by the configuration information is described based on the network environment indicator, and the indicator may specifically include any one or more of the following: network speed, synchronization mode, CBR, PPPP, and the like. The foregoing indicators can be used for evaluating the current network environment quality from different angles and aspects. It can be understood that when the current network environment quality is low, the data transmission may cause a high error rate, so in this case, it is necessary to perform HARQ retransmission for the data to be transmitted, thereby ensuring the correct rate of data transmission. Similarly, when the above indicators are indicative of high quality of current network environment, the bit error rate of data transmission is reduced, so that there is no need to perform HARQ retransmission for the data to be transmitted.

Optionally, based on the determination rule represented by the configuration information, the configuration information may include a provider service identifier (PSID)/an intelligent transportation systems application identifier (ITS-AID); an indication with respect to a quality of service (QoS) flow; an indication with respect to a radio link bearer; an indication with respect to a source address and/or a target address; or an indication with respect to a logical channel. Herein, the configuration information is used for representing an indication granularity for determining whether HARQ needs to be performed for the data to be transmitted. For example, whether the HARQ retransmission needs to be performed may be determined based on the PSID/ITS-AID, whether the HARQ retransmission needs to be performed may be determined based on the QoS flow, whether the HARQ retransmission needs to be performed may be determined based on the source address and/or the target address, and whether the HARQ retransmission needs to be performed may be determined based on the logical channel.

In the foregoing optional example, the determining, according to the configuration information, whether HARQ retransmission needs to be performed for the data to be transmitted may include: detecting whether the PSID/ITS-AID corresponding to the data to be transmitted is the PSID/ITS-AID in the indication with respect to the PSID/ITS-AID included in the configuration information; and determining, according to the detection result, whether HARQ retransmission needs to be performed for the data to be transmitted. Correspondingly, exemplary implementations of the configuration information for the indication with respect to the QoS flow, the indication with respect to the radio link bearer, the indication with respect to the source address and/or the target address, the indication with respect to the logical channel may refer to the description of the foregoing PSID/ITS-AID, which are not repeated herein.

Optionally, the configuration information may include at least one of: an indication on whether HARQ retransmission needs to be performed; or an indication of reliability description information. For example, the determination rule represented by the configuration information may be described directly based on whether HARQ retransmission needs to be performed. If the configuration information is an indication that the HARQ retransmission needs to be performed, it may be determined that HARQ retransmission needs to be performed for the data to be transmitted; if the configuration information is an indication that the HARQ retransmission does not need to be performed, it may be determined that no HARQ retransmission needs to be performed for the data to be transmitted may be determined. For another example, the determination rule represented by the configuration information may be described based on reliability requirements corresponding to whether HARQ retransmission needs to be performed. If the determination rule represented by the configuration information is described based on reliability requirements corresponding to that HARQ retransmission needs to be performed, then it is detected whether the reliability requirement of the data to be transmitted conforms to the reliability description information in the configuration information, if yes, it is determined that HARQ retransmission needs to be performed for the data to be transmitted; and if not, it is determined that no HARQ retransmission needs to be performed for the data to be transmitted.

As an embodiment, if the configuration information includes at least one of: an indication with respect to a PSID/ITS-AID; an indication with respect to a QoS flow; an indication with respect to a radio link bearer; an indication with respect to a source address and/or a destination address; or an indication with respect to a logical channel, the configuration information may further include an indication on whether HARQ retransmission needs to be performed and/or an indication reliability description information.

In this embodiment, the reliability description information may include a QoS attribute, and it may be understood that the QoS attribute may include a QoS parameter and/or a threshold or a threshold range of the QoS parameter. As an example, the QoS parameter may include at least one of QoS classification, priority, bit error rate, transmission success rate, and the like.

In the foregoing optional example, the determining, according to the configuration information, whether HARQ retransmission needs to be performed for the data to be transmitted may include: detecting whether the PSID/ITS-AID corresponding to the data to be transmitted is the PSID/ITS-AID in the indication with respect to the PSID/ITS-AID included in the configuration information; if it is detected that the PSID/ITS-AID corresponding to the data to be transmitted is the PSID/ITS-AID in the indication with respect to the PSID/ITS-AID included in the configuration information, and the configuration information includes the indication with respect to the PSID/ITS-AID as well as an indication that HARQ retransmission needs to be performed, then it is determined that HARQ retransmission needs to be performed for the data to be transmitted. If it is detected that the PSID/ITS-AID corresponding to the data to be transmitted is not the specific PSID/ITS-AID in the indication with respect to the PSID/ITS-AID included in the configuration information; or if it is detected that the PSID/ITS-AID corresponding to the data to be transmitted is the specific PSID/ITS-AID in the indication with respect to the PSID/ITS-AID included in the configuration information, but the configuration information includes the indication with respect to the PSID/ITS-AID as well as an indication that HARQ retransmission does not need to be performed, then it is determined that no HARQ retransmission needs to be performed for the data to be transmitted.

In the foregoing optional example, the determining, according to the configuration information, whether HARQ retransmission needs to be performed for the data to be transmitted may include: detecting whether the QoS flow corresponding to the data to be transmitted is the QoS flow in the indication with respect to the QoS flow included in the configuration information; if it is detected that the QoS flow corresponding to the data to be transmitted is the QoS flow in the indication with respect to the QoS flow included in the configuration information and the QoS parameter corresponding to the data to be transmitted satisfies the QoS attribute in the indication with respect to the QoS attribute included in the configuration information, and the configuration information includes an indication that HARQ retransmission needs to be performed, then it is determined that HARQ retransmission needs to be performed for the data to be transmitted. Otherwise, it is determined that no HARQ retransmission needs to be performed for the data to be transmitted.

Optionally, the determining, according to the configuration information, whether HARQ retransmission needs to be performed for the data to be transmitted may include: determining whether HARQ retransmission needs to be performed for the data to be transmitted according to a mapping relationship between a combination of the configuration information and channel quality information and a HARQ retransmission parameter.

In the foregoing optional embodiment, the channel quality information may be used for representing the quality of network environment, and the channel quality information may include at least one of the following: a constant bit rate (CBR), a reference signal receiving power (RSRP), a reference signal receiving quality (RSRQ), a received signal strength indication (RSSI), and a signal to interference plus noise ratio (SINR). The transmitting end UE may acquire in advance the mapping relationship between the combination of the configuration information and the channel quality information and the HARQ retransmission parameter. When the configuration information is received, the channel quality information when the data to be transmitted is sent is detected, the transmitting end UE may query the mapping relationship according to the received configuration information and the detected channel quality information, so as to obtain a corresponding HARQ retransmission parameter. When the obtained HARQ retransmission parameter is 0, it may be determined that no HARQ retransmission needs to be performed; and when the obtained HARQ retransmission parameter is not 0, it may be determined that HARQ retransmission needs to be performed.

For the foregoing solution described in this embodiment, after determining that the HARQ retransmission needs to be performed for the data to be transmitted, the transmitting end UE may determine a HARQ transmission mode of the data to be transmitted and, based on different HARQ transmission modes, notify the receiving end UE of the HARQ transmission mode, so that the receiving end UE can correctly receive the data to be transmitted as well as the HARQ retransmission data of the data to be transmitted according to the received HARQ transmission mode. Accordingly, in a possible implementation, the technical solution shown in FIG. 3 may further include sending, to the receiving end UE, the HARQ transmission mode of the data to be transmitted.

It should be noted that the HARQ transmission mode may specifically include: a HARQ retransmission mode without requiring feedback and a HARQ retransmission mode requiring feedback. In V2X, data transmission and reception are mostly performed between terminals in V2X. Therefore, the HARQ transmission mode of the data to be transmitted can be transmitted by using notification information. Accordingly, the sending, to the receiving end UE, the HARQ transmission mode of the data to be transmitted through the PSCCH may specifically include sending, to the receiving end UE, the HARQ transmission mode of the data to be transmitted through a physical sidelink control channel (PSCCH) and/or a physical sidelink shared channel (PSSCH).

Specifically, for the PSCCH and/or the PSSCH, the transmitting end UE may send the HARQ transmission mode of the data to be transmitted in any of the following manners: sending, to the receiving end UE, the HARQ transmission mode of the data to be transmitted through content carried by the PSCCH and/or the PSSCH; or sending, to the receiving end UE, the HARQ transmission mode of the data to be transmitted through a time and/or frequency position of the PSCCH and/or the PSSCH; or sending, to the receiving end UE, the HARQ transmission mode of the data to be transmitted through reference signal of the PSCCH and/or the PSSCH.

In the above optional example, the sending, to the receiving end UE, the HARQ transmission mode of the data to be transmitted through the PSCCH may include: sending, to the receiving end UE, the HARQ transmission mode of the data to be transmitted through radio resource control (RRC) signaling, medium access control layer control element (MAC CE) or PC5 interface signal (PC5-S). Herein, the PC5 interface is an interface for performing D2D communication between V2X service terminals.

Based on the foregoing specific HARQ transmission mode, in an optional example, the transmitting, according to the HARQ retransmission mode, the data to be transmitted to the receiving end UE may include when the HARQ retransmission mode is the HARQ retransmission mode without requiring feedback, sending the data to be transmitted as well as the HARQ retransmission data of the data to be transmitted directly to the receiving end UE according to a time and/or frequency resource location as predefined, without receiving feedback information from the receiving end UE with respect to the data to be transmitted.

Specifically, if the HARQ retransmission is performed without the feedback from the receiving end UE, the transmitting end UE may need to start a timer after sending the data to be transmitted and, after the timer ends, send the HARQ retransmission data of the data to be transmitted. The transmitting end UE may send in advance a specific HARQ transmission mode to the receiving end UE in the form of notification information, and the notification information may further include a specific time of the timer. Then, after receiving the data to be transmitted sent by the transmitting end UE, the receiving end UE can receive the HARQ retransmission data of the data to be transmitted sent by the transmitting end UE according to the time of timer as obtained in advance.

Based on the foregoing specific HARQ transmission mode, in another optional example, the transmitting, according to the HARQ retransmission mode, the data to be transmitted to the receiving end UE may include when the HARQ retransmission mode is the HARQ retransmission mode requiring feedback, waiting to receive the feedback information sent by the receiving end UE after finishing sending of the data to be transmitted, wherein the feedback information is used for indicating whether HARQ retransmission is performed for the data to be transmitted; and when the feedback information indicates performing HARQ retransmission for the data to be transmitted, sending the HARQ retransmission data of the data to be transmitted to the receiving end UE.

Specifically, if the HARQ retransmission is performed when requiring feedback from the receiving end UE, the receiving end UE may perform error detection on the data to be transmitted after receiving the same. If the detection result indicates that the receiving end UE correctly received the data to be transmitted, the transmitting end UE does not need to perform HARQ retransmission for the data to be transmitted. In such a case, the receiving end UE may not send any feedback to the transmitting end UE. The transmitting end UE may start a timer after sending the data to be transmitted, if no feedback information is received from the receiving end UE before the timer expires, it indicates that the data to be transmitted is correctly received by the receiving end UE, so that the HARQ retransmission data of the data to be transmitted is no longer transmitted. When the feedback information is received from the receiving end UE before the timer expires, and the feedback information indicates that the data to be transmitted is incorrectly received, the HARQ retransmission needs to be performed for the data to be transmitted, then the transmitting end UE sends the HARQ retransmission data of the data to be transmitted.

It can be understood that, in an exemplary implementation, the receiving end UE may also send feedback information to the transmitting end UE for the correct receiving of the data to be transmitted, thereby indicating the correct receiving of the data to be transmitted. After receiving such feedback information, the transmitting end UE does not send the HARQ retransmission data of the data to be transmitted. In such case, when the transmitting end UE does not receive the feedback information before the timer expires, it indicates that the data to be transmitted is not correctly received so that the transmitting end UE sends the HARQ retransmission data of the data to be transmitted to the receiving end UE.

Embodiment II

Figure 4:
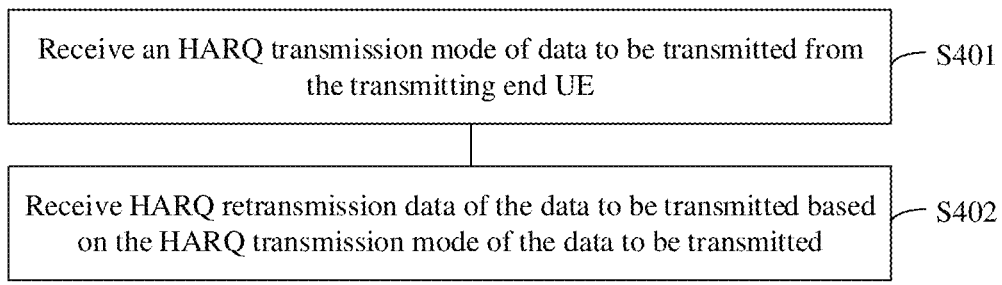
FIG. 4 is a schematic flowchart illustrating the method for data transmission according to another embodiment of the present disclosure.

Referring to FIG. 4, the method for data transmission according to an embodiment of the present disclosure is shown. The method is applied to the receiving end UE and includes the following steps.

In S401, a HARQ transmission mode of data to be transmitted is received from the transmitting end UE.

In S402, HARQ retransmission data of the data to be transmitted is received based on the HARQ transmission mode of the data to be transmitted.

It can be understood that the HARQ transmission mode of the data to be transmitted can be sent by the transmitting end UE in the form of notification information.

Through the technical solution shown in FIG. 4, the receiving end UE receives the HARQ retransmission data of the data to be transmitted based on the HARQ transmission mode of the data to be transmitted, thereby avoiding receiving HARQ retransmission data for all the data to be transmitted, so as to reduce waste of channel resources and achieve the balance between channel resource utilization and correct receiving rate of transmitted data.

For the technical solution shown in FIG. 4, as data transmission and reception are mostly performed between terminals in V2X, in a possible implementation, the receiving the HARQ transmission mode of the data to be transmitted sent from the transmitting end UE may include receiving the HARQ transmission mode of the data to be transmitted sent from the transmitting end UE through a PSCCH and/or a PSSCH.

The receiving the HARQ transmission mode of the data to be transmitted sent from the transmitting end UE through the PSCCH may include receiving the HARQ transmission mode of the data to be transmitted sent from the transmitting end UE through RRC signaling, MAC CE or PC5-S.

Specifically, for the PSCCH and/or the PSSCH, the receiving the HARQ transmission mode of the data to be transmitted sent from the transmitting end UE through the PSCCH and/or the PSSCH may include receiving the HARQ transmission mode of the data to be transmitted sent from the transmitting end UE through content carried by the PSCCH and/or the PSSCH; or receiving the HARQ transmission mode of the data to be transmitted sent from the transmitting end UE through a time and/or frequency position of the PSCCH and/or the PSSCH; or receiving the HARQ transmission mode of the data to be transmitted sent from the transmitting end UE through reference signal of the PSCCH and/or the PSSCH.

For the technical solution shown in FIG. 4, in a possible implementation, the HARQ transmission mode includes a HARQ retransmission mode without requiring feedback and a HARQ retransmission mode requiring feedback.

In the above implementation, when the HARQ transmission mode is the HARQ retransmission mode without requiring feedback, preferably, the receiving, according to the HARQ transmission mode of the data to be transmitted, the HARQ retransmission data of the data to be transmitted may include when the HARQ transmission mode is the HARQ retransmission mode without requiring feedback, receiving the data to be transmitted as well as the HARQ retransmission data of the data to be transmitted sent by the transmitting end UE at a preset time interval, without sending feedback information with respect to the data to be transmitted.

Specifically, if the HARQ retransmission is performed by the transmitting end UE without the feedback from the receiving end UE, the transmitting end UE may start a timer after sending the data to be transmitted and, after the timer ends, send the HARQ retransmission data of the data to be transmitted. For the receiving end UE, the transmitting end UE may notify in advance the receiving end UE of a specific HARQ transmission mode in the form of notification information, the notification information may further include a specific time of the timer. Then, after receiving the data to be transmitted sent by the transmitting end UE, the receiving end UE can receive the HARQ retransmission data of the data to be transmitted sent by the transmitting end UE according to the time of timer as obtained in advance. Moreover, the receiving end UE can determine the actual data content of the data to be transmitted according to the received data to be transmitted and the HARQ retransmission data of the data to be transmitted.

In the above implementation, when the HARQ transmission mode is the HARQ retransmission mode requiring feedback, preferably, the receiving, according to the HARQ transmission mode of the data to be transmitted, the HARQ retransmission data of the data to be transmitted may include when the HARQ transmission mode is the HARQ retransmission mode requiring feedback, sending feedback information with respect to the data to be transmitted; and when the feedback information indicates performing HARQ retransmission for the data to be transmitted, receiving HARQ retransmission data of the data to be transmitted sent by the transmitting end UE.

Specifically, when the HARQ transmission mode is the HARQ retransmission mode requiring feedback, after receiving the data to be transmitted sent by the transmitting end UE, the receiving end UE may generate feedback information according to a receiving state of the data to be transmitted. Herein, the feedback information is used for indicating whether to perform HARQ retransmission for the data to be transmitted.

When the feedback information indicates performing HARQ retransmission for the data to be transmitted, the HARQ retransmission data of the data to be transmitted sent by the transmitting end UE is received.

Specifically, if the HARQ retransmission is performed by the transmitting end UE when feedback is required from the receiving end UE, the receiving end UE may perform error detection on the data to be transmitted after receiving the same. If the detection result indicates that the receiving end UE correctly received the data to be transmitted, the transmitting end UE does not need to perform HARQ retransmission for the data to be transmitted. In such case, the receiving end UE may not send any feedback to the transmitting end UE. The transmitting end UE may start a timer after sending the data to be transmitted, if no feedback information is received from the receiving end UE before the timer expires, it indicates that the data to be transmitted is correctly received by the receiving end UE, so that the HARQ retransmission data of the data to be transmitted is no longer transmitted. When the feedback information is received from the receiving end UE before the timer expires, and the feedback information indicates that the data to be transmitted is incorrectly received, the HARQ retransmission needs to be performed for the data to be transmitted, then the transmitting end UE sends the HARQ retransmission data of the data to be transmitted.

Figure 5:
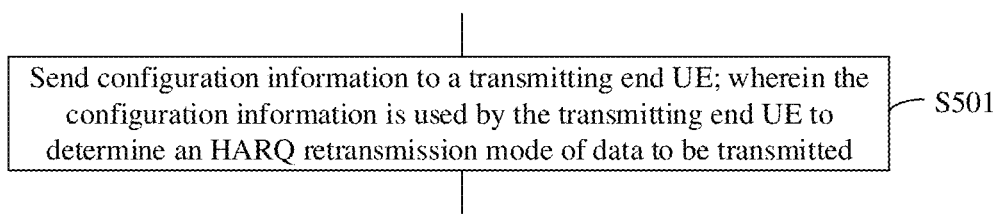
FIG. 5 is a schematic flowchart illustrating the method for data transmission according to still another embodiment of the present disclosure.

In addition, in an exemplary implementation, the receiving end UE may also send feedback information to the transmitting end UE for the correct receiving of the data to be transmitted, thereby indicating the correct receiving of the data to be transmitted. After receiving such feedback information, the transmitting end UE does not send the HARQ retransmission data of the data to be transmitted. In such case, when the transmitting end UE does not receive the feedback information before the timer expires, it indicates that the data to be transmitted is not correctly received so that the transmitting end UE sends the HARQ retransmission data of the data to be transmitted to the receiving end UE Embodiment III Referring to FIG. 5, the method for data transmission according to an embodiment of the present disclosure is shown. The method is applied to a network side device and includes the following steps.

In S501, configuration information is sent to a transmitting end UE; wherein the configuration information is used by the transmitting end UE to determine a HARQ retransmission mode of data to be transmitted.

The transmitting end UE determines whether to perform HARQ retransmission according to the configuration information so that the transmitting end UE does not need to adopt HARQ retransmission for all data to be transmitted, thereby avoiding waste of channel resources, and achieving balance between channel resource utilization and correct reception rate of the transmitted data.

For the technical solution of the embodiment, in an exemplary implementation, the configuration information may be determined by a high layer device of the network protocol layer based on requirement information as predefined and sent to the transmitting end UE. Alternatively, the configuration information may be determined by an access network device based on the condition of requiring HARQ retransmission and sent to the transmitting end UE. Therefore, the network side device may specifically be a high layer device of the network protocol layer or an access network device.

It should be noted that the configuration information may be used for representing a determination rule for determining whether to perform the HARQ retransmission so that the transmitting end UE can perform determination for all the data to be transmitted according to the determination rule. Optionally, based on the determining rule represented by the configuration information, the configuration information may include an indication that HARQ retransmission needs to be performed for a target service, or an indication that HARQ retransmission needs to be performed for a target address.

Optionally, the configuration information includes at least one of following: an indication with respect to a PSID/an ITS-AID; an indication with respect to a QoS flow; an indication with respect to a radio link bearer; an indication with respect to a source address and/or a target address; or an indication with respect to a logical channel.

Optionally, the configuration information includes at least one of: an indication on whether HARQ retransmission needs to be performed; or an indication of reliability description information.

Optionally, the determining, according to the configuration information, whether HARQ retransmission needs to be performed for the data to be transmitted may include: determining whether HARQ retransmission needs to be performed for the data to be transmitted according to a mapping relationship between a combination of the configuration information and the channel quality information, and the HARQ retransmission parameter.

Optionally, the determination rule represented by the configuration information is described based on the reliability requirement. Accordingly, the configuration information may also include reliability description information on that HARQ retransmission needs to be performed for a target address or a target service, which is not detailed in this embodiment.

Optionally, based on the determining rule represented by the configuration information, the configuration information may include a network environment indicator threshold corresponding to a situation where HARQ retransmission needs to be performed.

In the foregoing optional example, the determination rule represented by the configuration information is described based on the network environment indicator, and the indicator may specifically include any one or more of the following: network speed, synchronization mode, CBR, PPPP, and the like. The foregoing indicators can be used for evaluating the current network environment quality from different angles and aspects. It can be understood that when the current network environment quality is low, the data transmission may cause a high error rate, so in this case, it is necessary to perform HARQ retransmission for the data to be transmitted, thereby ensuring the correct rate of data transmission. Similarly, when the above indicators are indicative of high quality of current network environment, the bit error rate of data transmission is reduced, so that there is no need to perform HARQ retransmission for the data to be transmitted.

Embodiment IV

Figure 6:
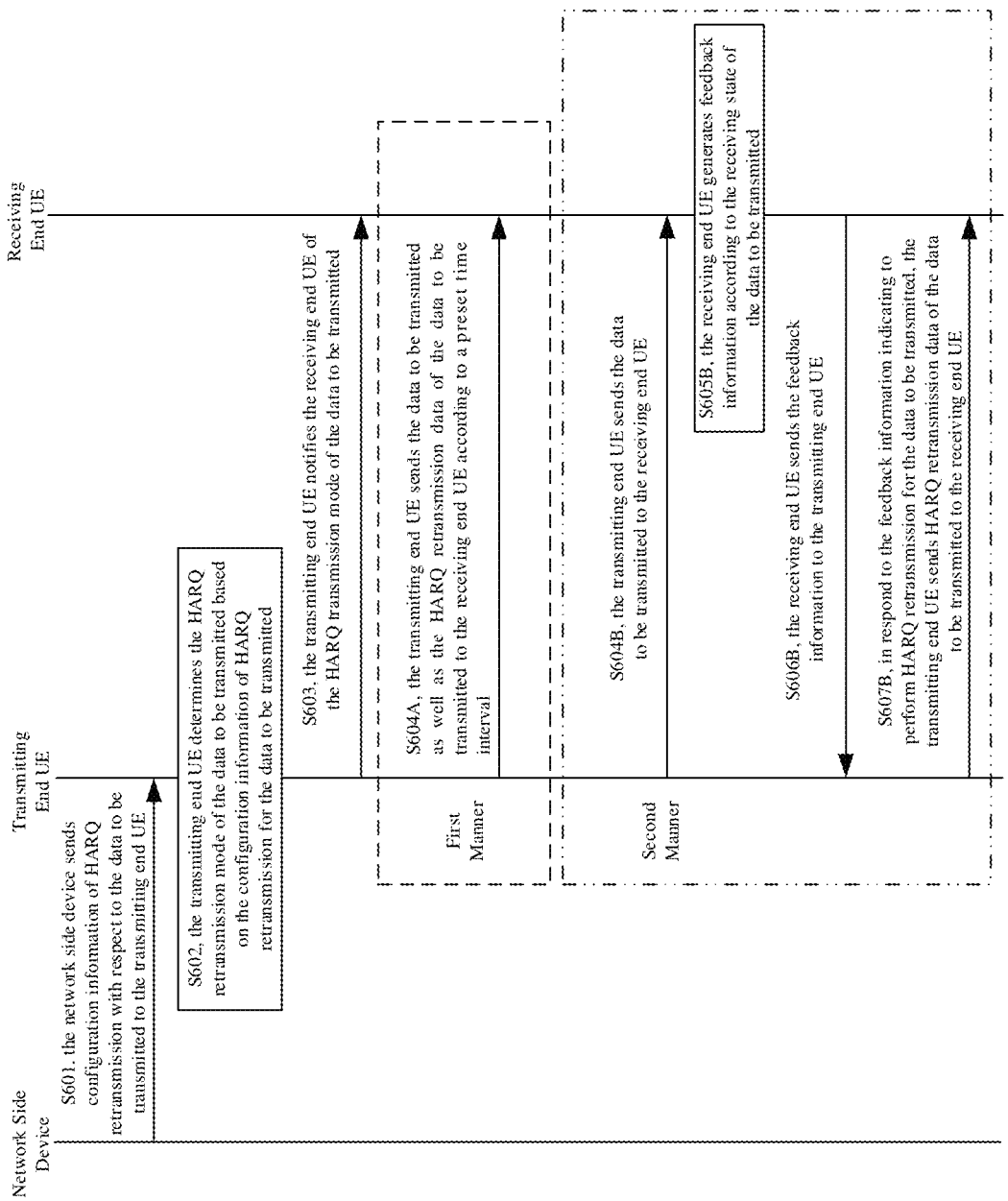
FIG. 6 is a schematic flowchart illustrating a data transmission according to an embodiment of the present disclosure.

Referring to FIG. 6, a specific process of data transmission according to an embodiment of the present disclosure is shown, which may be applied to a network architecture including a network side device, a receiving end UE and a transmitting end UE. The specific process may include the following steps.

In S601, the network side device sends configuration information of HARQ retransmission with respect to the data to be transmitted to the transmitting end UE.

The configuration information is used for representing a determination rule for performing HARQ retransmission.

Specifically, according to different reasons of the determining rule, in an implementation, the configuration information may include an indication that HARQ retransmission needs to be performed for a target service or an indication that HARQ retransmission needs to be performed for a target address; or reliability description information on that HARQ retransmission needs to be performed for a target address or a target service; or a network environment indicator threshold corresponding to a situation where HARQ retransmission needs to be performed; or at least one of an indication with respect to a PSID/ITS-AID; an indication with respect to a QoS flow; an indication with respect to a radio link bearer; an indication with respect to a source address and/or a target address; an indication with respect to a logical channel; or at least one of an indication on whether HARQ retransmission needs to be performed or an indication of reliability description information.

For the description of the specific configuration information, it may refer to the corresponding description in the foregoing embodiments, which are not detailed herein again.

In S602, the transmitting end UE determines the HARQ retransmission mode of the data to be transmitted based on the configuration information of HARQ retransmission for the data to be transmitted.

Specifically, the HARQ retransmission mode may include performing HARQ retransmission for the data to be transmitted or not performing HARQ retransmission for the data to be transmitted. Based on this, in this step, the transmitting end UE may detect whether the data to be transmitted complies with the determining rule; if yes, it is determined to perform HARQ retransmission for the data to be transmitted; otherwise, it is determined not to perform HARQ retransmission for the data to be transmitted.

It is to be noted that, if it is determined that HARQ retransmission is performed for the data to be transmitted, in order to enable the receiving end UE to correctly receive the data to be transmitted as well as the HARQ retransmission data of the data to be transmitted, the process may further include S603, in which the transmitting end UE notifies the receiving end UE of the HARQ transmission mode of the data to be transmitted.

Specifically, the HARQ transmission mode may specifically include a HARQ retransmission mode without requiring feedback and a HARQ retransmission mode requiring feedback. In the case of V2X, the data transmission and reception are mostly performed between the terminals in V2X. Accordingly, the step S603 may specifically include the transmitting end UE notifies the receiving end UE of the HARQ transmission mode of the data to be transmitted through PSCCH and/or PSSCH.

Based on the above two HARQ transmission modes, the implementation is performed in the following two ways, respectively.

When the HARQ retransmission mode is the HARQ retransmission mode without requiring feedback, it may refer to the first manner shown as the dotted line in FIG. 6.

In S604A, the transmitting end UE sends the data to be transmitted as well as the HARQ retransmission data of the data to be transmitted to the receiving end UE according to a time and/or frequency resource location as predefined.

Correspondingly, the receiving end UE can receive the data to be transmitted as well as the HARQ retransmission data of the data to be transmitted sent by the transmitting end UE according to a preset time interval.

When the HARQ transmission mode is the HARQ retransmission mode requiring feedback, it may refer to the second manner shown as the dotted line in FIG. 6.

In S604B, the transmitting end UE sends the data to be transmitted to the receiving end UE.

It should be noted that after finish the sending, the transmitting end UE may wait to receive the feedback information sent by the receiving end UE.

In S605B, the receiving end UE generates feedback information according to the receiving state of the data to be transmitted, where the feedback information is used for indicating whether to perform HARQ retransmission for the data to be transmitted.

In S606B, the receiving end UE sends the feedback information to the transmitting end UE.

In 5607B, in response to the feedback information indicating to perform HARQ retransmission for the data to be transmitted, the transmitting end UE sends HARQ retransmission data of the data to be transmitted to the receiving end UE.

For the detailed description of the steps in this embodiment, reference may be made to the foregoing Embodiments I to III, and details are not repeated herein.

Embodiment V

Figure 7A:
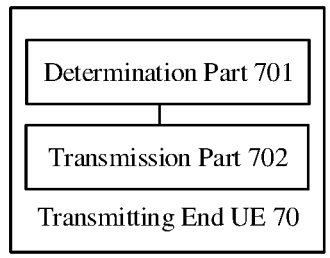
FIG. 7A is a block diagram illustrating a transmitting end UE according to an embodiment of the present disclosure.

Referring to FIG. 7A, a transmitting end UE 70 according to an embodiment of the present disclosure is shown, which may include a determination part 701 and a transmission part 702.

The determination part 701 is configured to determine a HARQ retransmission mode of the data to be transmitted based on configuration information on HARQ retransmission of data to be transmitted.

The transmission part 702 is configured to transmit the data to be transmitted to the receiving end UE according to the HARQ retransmission mode.

In the above solution, the determining part 701 is configured to receive the configuration information; and determine, according to the configuration information, whether HARQ retransmission needs to be performed for the data to be transmitted.

In the above solution, the configuration information includes an indication that HARQ retransmission needs to be performed for a target service or an indication that HARQ retransmission needs to be performed for a target address.

Correspondingly, the determination part 701 is configured to detect whether an indication that HARQ retransmission needs to be performed for a target service or an indication that HARQ retransmission needs to be performed for a target address is included in the data to be transmitted; determine, if yes, to perform HARQ retransmission for the data to be transmitted; and determine, if no, not to perform HAQR retransmission for the data to be transmitted.

In the above solution, the configuration information includes at least one of: an indication with respect to a PSID/ITS-AID; an indication with respect to a QoS flow; an indication with respect to a radio link bearer; an indication with respect to a source address and/or a target address; or an indication with respect to a logical channel.

In the above solution, the configuration information includes at least one of: an indication on whether HARQ retransmission needs to be performed; or an indication of reliability description information.

In the above solution, the determination part 701 is configured to determine whether HARQ retransmission needs to be performed for the data to be transmitted according to a mapping relationship between a combination of the configuration information and channel quality information and a HARQ retransmission parameter.

In the above solution, the configuration information includes reliability description information on that HARQ retransmission needs to be performed for a target address or a target service.

Correspondingly, the determination part 701 is configured to: detect whether reliability requirement of the data to be transmitted meets the reliability description information on that HARQ retransmission needs to be performed for a target address or a target service; determine, if yes, to perform HARQ retransmission for the data to be transmitted; and determine, if no, not to perform HARQ retransmission for the data to be transmitted.

In the above solution, the configuration information includes a network environment indicator threshold corresponding to a situation where HARQ retransmission needs to be performed.

Figure 7B:
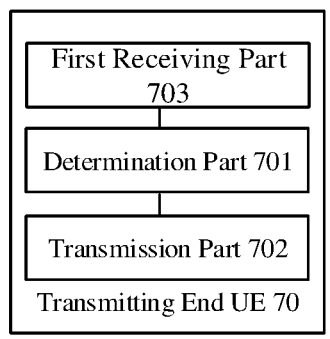
FIG. 7B is a block diagram illustrating a transmitting end UE according to another embodiment of the present disclosure.

Correspondingly, the determination part 701 is configured to detect whether a network environment indicator value when the data to be transmitted is sent exceeds the network environment indicator threshold corresponding to the situation where HARQ retransmission needs to be performed; determine, if yes, to perform HARQ retransmission for the data to be transmitted; and determine, if no, not to perform HAQR retransmission for the data to be transmitted In the above solution, referring to FIG. 7B, the transmitting end UE 70 may further include: a first receiving part 703 configured to send the HARQ transmission mode of the data to be transmitted to the receiving end UE.

In the above solution, the first receiving part 703 is configured to send, to the receiving end UE, the HARQ transmission mode of the data to be transmitted through PSCCH and/or PSSCH.

In the foregoing solution, the first receiving part 703 is configured to send, to the receiving end UE, the HARQ transmission mode of the data to be transmitted through RRC signaling, MAC CE or PC5-S.

In the foregoing solution, the first receiving part 703 is configured to: send, to the receiving end UE, the HARQ transmission mode of the data to be transmitted through content carried by the PSCCH and/or the PSSCH; or send, to the receiving end UE, the HARQ transmission mode of the data to be transmitted through a time and/or frequency position of the PSCCH and/or the PSSCH; or send, to the receiving end UE, the HARQ transmission mode of the data to be transmitted through reference signal of the PSCCH and/or the PSSCH.

In the above solution, the HARQ transmission mode includes a HARQ retransmission mode without requiring feedback and a HARQ retransmission mode requiring feedback.

In the above solution, the transmission part 702 is configured to when the HARQ retransmission mode is the HARQ retransmission mode without requiring feedback, send the data to be transmitted as well as the HARQ retransmission data of the data to be transmitted directly to the receiving end UE according to a time and/or frequency resource location as predefined, without receiving feedback information from the receiving end UE with respect to the data to be transmitted.

In the above solution, the transmission part 702 is configured to when the HARQ retransmission mode is the HARQ retransmission mode requiring feedback, wait to receive the feedback information sent by the receiving end UE after finishing sending of the data to be transmitted, wherein the feedback information is used for indicating whether HARQ retransmission is performed for the data to be transmitted; and when the feedback information indicates performing HARQ retransmission for the data to be transmitted, send the HARQ retransmission data of the data to be transmitted to the receiving end UE.

It can be understood that in this embodiment, the "part" may be a partial circuit, a partial processor, a partial program or software, and the like. The "part" may also be a unit, a module, or may be non-modular.

In addition, each component in this embodiment may be integrated into one processing unit, or each unit may exist physically separately, or two or more units may be integrated into one unit. The above integrated unit can be implemented in the form of hardware or in the form of a software function module.

The integrated unit may be stored in a computer-readable storage medium if it is implemented in the form of a software function module and is not sold or used as a stand-alone product. Based on such understanding, the essential technical solution of the embodiment, in other words, the part thereof contributing to the prior art or all or part of the technical solution, can be embodied in the form of a software product stored in a storage medium, including a plurality of instructions enabling a computer device (e.g., a personal computer, a server, a network device, or the like) or a processor to perform all or part of the steps of the method described in the embodiments. The foregoing storage medium may include a U disk, a mobile hard disk, a read-only memory (ROM), a random access memory (RAM), a magnetic disk, an optical disk, or the like, which can store program codes.

Therefore, the present embodiment provides a computer storage medium storing a program for data transmission which, when being implemented by at least one processor, is used for implementing the steps of the method described in the Embodiment I.

Figure 8:
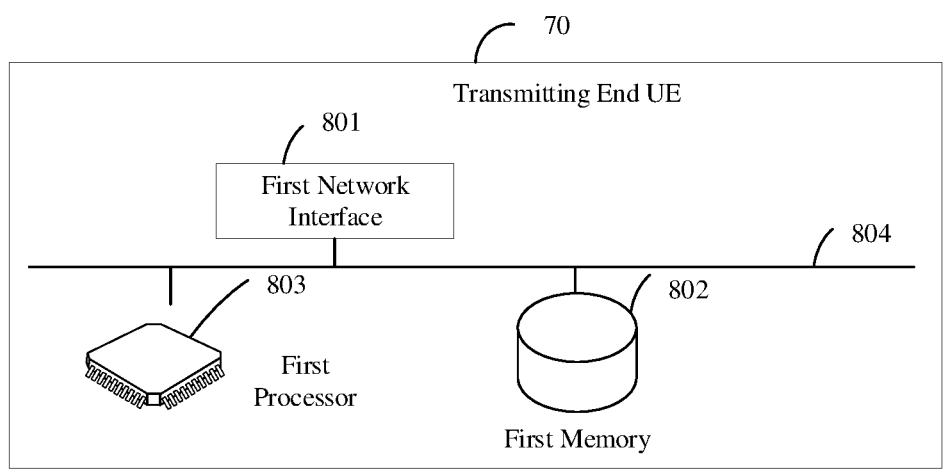
FIG. 8 is a schematic structural diagram illustrating specific hardware of a transmitting end UE according to an embodiment of the present disclosure.

Based on the foregoing transmitting end UE 70 and the computer storage medium, referring to FIG. 8, a specific hardware structure of the transmitting end UE 70 provided by the embodiment of the present disclosure may include: a first network interface 801, a first memory 802 and a first processor 803. The various components are coupled together via a bus system 804. It may be understood that the bus system 804 is used for implementing connection communication between these components. The bus system 804 includes, in addition to the data bus, a power bus, a control bus, and a status signal bus. However, for clarity of description, various buses are labeled as bus system 804 in FIG. 8.

The first network interface 801 is configured to receive and send signals during the process of transmitting and receiving information with other external network elements.

The first memory 802 is configured to store a computer program capable of running on the first processor 803.

The first processor 803, when running the computer program, is configured to perform determining a HARQ retransmission mode of data to be transmitted based on configuration information on HARQ retransmission of the data to be transmitted; and transmitting, according to the HARQ retransmission mode, the data to be transmitted to a receiving end UE.

It may be understood that the first memory 802 in the embodiments of the present disclosure may be a transitory memory or a non-transitory memory or may include both transitory and non-transitory memory. The non-transitory memory may be a read-only memory (ROM), a programmable read-only memory (PROM), an erasable programmable read-only memory (Erasable PROM, EPROM), an electric erase programmable read-only memory (EEPROM) or a flash memory. The transitory memory may be a random-access memory (RAM) serving as an external cache. By way of example without limitation, many forms of RAM are available, such as static random access memory (SRAM), dynamic random access memory (DRAM), synchronous dynamic random access memory (Synchronous DRAM, SDRAM), double data rate synchronous dynamic random access memory (DDRSDRAM), enhanced synchronous dynamic random access memory (ESDRAM), synchlink dynamic random access memory (SDRAM) and direct memory bus random access memory (DRRAM). The first memory 802 in the systems and methods described herein is intended to include, without being limited to, these and any other suitable types of memory.

The first processor 803 may be an integrated circuit chip with signal processing capability. In an implementation, each step of the foregoing methods may be completed by an integrated logic circuit of hardware in the first processor 803 or an instruction in the form of software. The first processor 803 may be a general-purpose processor, a digital signal processor (DSP), an application-specific integrated circuit (ASIC), or a field-programmable gate array (FPGA), or other programmable logic devices, discrete gates or transistor logic devices, discrete hardware components. The methods, steps, and logical block diagrams disclosed in the embodiments of the present disclosure may be implemented or carried out. The general-purpose processor may be a microprocessor or any conventional processor or the like. The steps of the method disclosed in the embodiments of the present disclosure may be directly implemented by the hardware decoding processor or may be performed by a combination of hardware and software modules in the decoding processor. The software module can be located in a conventional storage medium such as random-access memory, flash memory, read-only memory, programmable read-only memory or electrically erasable programmable memory, registers, and the like. The storage medium is located in the first memory 802, and the first processor 803 reads the information in the first memory 802 and completes the steps of the above method in combination with the hardware thereof.

It may be understood that the embodiments described herein can be implemented in hardware, software, firmware, middleware, microcode, or a combination thereof. For a hardware implementation, the processing unit can be implemented in one or more of application-specific integrated circuit (ASIC), digital signal processing (DSP), digital signal processing device (DSPD), programmable logic device (PLD), field-programmable gate array (FPGA), general-purpose processor, controller, microcontroller, microprocessor, other electronic units or a combination thereof for performing the functions described herein.

For a software implementation, the techniques described herein can be implemented by modules (e.g., procedures, functions, and the like) that perform the functions described herein. The software code can be stored in memory and executed by the processor. The memory can be implemented in the processor or external to the processor.

Specifically, the first processor 803 in the transmitting end UE 70, when running the computer program, is further configured to perform the method steps described in the foregoing Embodiment I, and details are not repeated herein.

Embodiment VI

Figure 9:
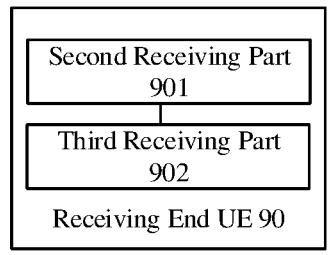
FIG. 9 is a block diagram illustrating a receiving end UE according to an embodiment of the present disclosure.

Referring to FIG. 9, a composition of a receiving end UE 90 is illustrated according to an embodiment of the present disclosure, including a second receiving part 901 and a third receiving part 902.

The second receiving part 901 is configured to receive a HARQ transmission mode of the data to be transmitted sent from the transmitting end UE.

The third receiving part 902 is configured to receive HARQ retransmission data of the data to be transmitted based on the HARQ transmission mode of the data to be transmitted.

In the above solution, the second receiving part 901 is configured to receive the HARQ transmission mode of the data to be transmitted sent from the transmitting end UE through PSCCH and/or PSSCH.

In the above solution, the second receiving part 901 is configured to receive the HARQ transmission mode of the data to be transmitted sent from the transmitting end UE through RRC signaling, MAC CE or PC5-S.

Specifically, the second receiving part 901 is configured to receive the HARQ transmission mode of the data to be transmitted sent from the transmitting end UE through content carried by the PSCCH and/or the PSSCH; or receive the HARQ transmission mode of the data to be transmitted sent from the transmitting end UE through a time and/or frequency position of the PSCCH and/or the PSSCH; or receive the HARQ transmission mode of the data to be transmitted sent from the transmitting end UE through reference signal of the PSCCH and/or the PSSCH.

In the above solution, the HARQ transmission mode includes a HARQ retransmission mode without requiring feedback and a HARQ retransmission mode requiring feedback.

In the above solution, the third receiving part 902 is configured to send no feedback information with respect to the data to be transmitted when the HARQ transmission mode is the HARQ retransmission mode without requiring feedback. Specifically, the data to be transmitted and the HARQ retransmission data of the data to be transmitted sent by the transmitting end UE may be received according to a preset time interval.

In the above solution, the third receiving part 902 is configured to send feedback information with respect to the data to be transmitted when the HARQ transmission mode is the HARQ retransmission mode requiring feedback; receive the HARQ retransmission data of the data to be transmitted sent from the transmitting end UE when the feedback information indicates performing HARQ retransmission with respect to the data to be transmitted. Specifically, after receiving the data to be transmitted sent by the transmitting end UE, the third receiving part 902 generates feedback information according to the receiving state of the data to be transmitted; wherein the feedback information is used for indicating whether to perform HARQ retransmission for the data to be transmitted; and receive the HARQ retransmission data of the data to be transmitted sent from the transmitting end UE when the feedback information indicates performing HARQ retransmission with respect to the data to be transmitted.

In addition, the embodiments provide a computer storage medium storing a program for data transmission which, when being implemented by at least one processor, is used for implementing the steps of the method described in the Embodiment II. A detailed description of the computer storage medium may refer to the description in the Embodiment V, which is not repeated herein.

Figure 10:
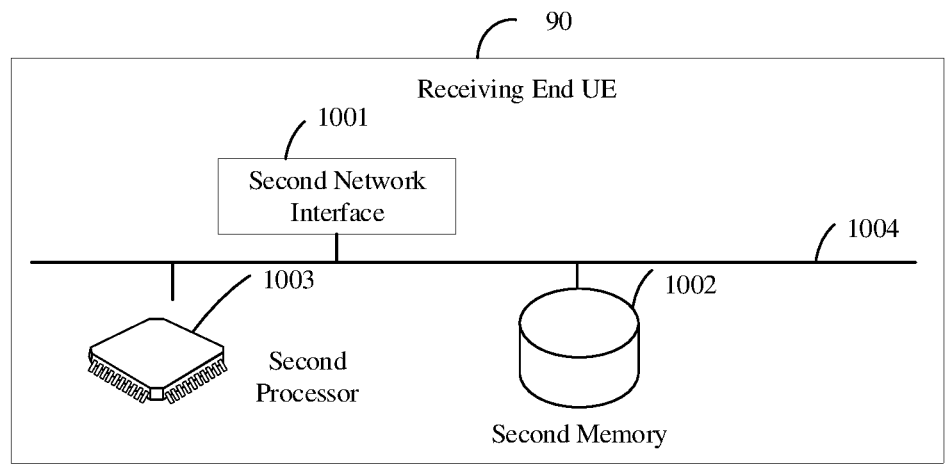
FIG. 10 is a schematic structural diagram illustrating specific hardware of a receiving end UE according to an embodiment of the present disclosure.

Based on the foregoing receiving end UE 90 and the computer storage medium, referring to FIG. 10, a specific hardware structure of the receiving end UE 90 provided by the embodiment of the present disclosure may include: a second network interface 1001, a second memory 1002 and a second processor 1003. The various components are coupled together via a bus system 1004. It may be understood that the bus system 1004 is used for implementing connection communication between these components. The bus system 1004 includes, in addition to the data bus, a power bus, a control bus, and a status signal bus. However, for clarity of description, various buses are labeled as bus system 1004 in FIG. 10. The second network interface 1001 is configured to receive and send signals during the process of transmitting and receiving information with other external network elements.

The second memory 1002 is configured to store a computer program capable of running on the second processor 1003.

The second processor 1003, when running the computer program, is configured to perform receiving a HARQ transmission mode of data to be transmitted sent from a transmitting end UE; and receiving, based on the HARQ transmission mode of the data to be transmitted, HARQ retransmission data of the data to be transmitted.

It is to be understood that the components in the specific hardware structure of the receiving end UE 90 in this embodiment are similar to the corresponding parts in the Embodiment V and are not repeated herein.

Specifically, the second processor 1003 of the receiving end UE 90, when running the computer program, is further configured to perform the method steps described in the foregoing Embodiment II, and details are not repeated herein.

Embodiment VII

Figure 11:
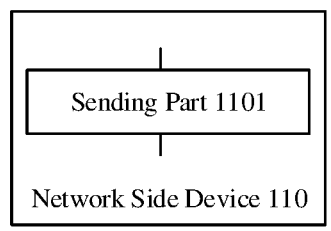
FIG. 11 is a block diagram illustrating a network side device according to an embodiment of the present disclosure.

Referring to FIG. 11, a composition of a network side device 110 is illustrated according to an embodiment of the present disclosure, which may include: a sending part 1101 configured to send configuration information to a transmitting end UE. The configuration information is used for determining a HARQ retransmission mode of data to be transmitted.

In the above solution, the configuration information includes an indication that HARQ retransmission needs to be performed for a target service, or an indication that HARQ retransmission needs to be performed for a target address.

In the foregoing solution, the configuration information includes a network environment indicator threshold corresponding to a situation where HARQ retransmission needs to be performed.

In addition, the embodiments provide a computer storage medium storing a program for data transmission which, when being implemented by at least one processor, is used for implementing the steps of the method described in the Embodiment III. A detailed description of the computer storage medium may refer to the description in the Embodiment V, which is not repeated herein.

Figure 12:
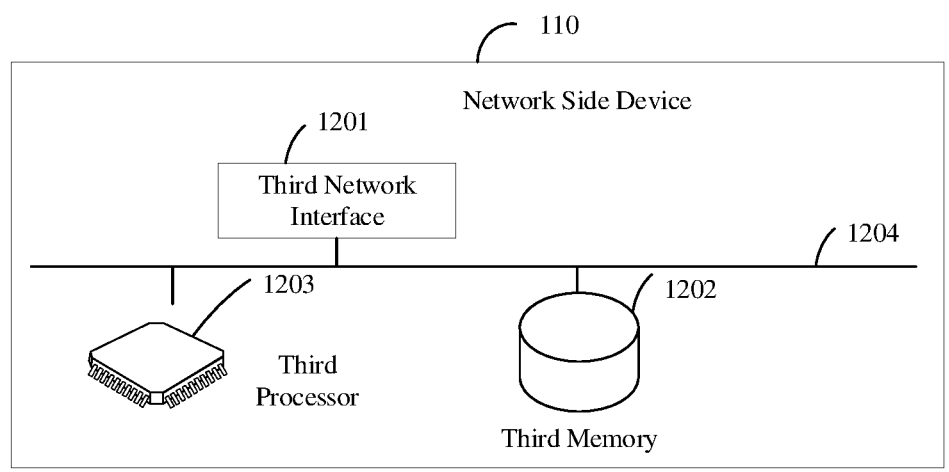
FIG. 12 is a schematic structural diagram illustrating specific hardware of a network side device according to an embodiment of the present disclosure.

Based on the foregoing network side device 110 and the computer storage medium, referring to FIG. 12, a specific hardware structure of the network side device 110 provided by the embodiment of the present disclosure may include: a third network interface 1201, a third memory 1202 and a third processor 1203. The various components are coupled together via a bus system 1204. It may be understood that the bus system 1204 is used for implementing connection communication between these components. The bus system 1204 includes, in addition to the data bus, a power bus, a control bus, and a status signal bus. However, for clarity of description, various buses are labeled as bus system 1204 in FIG. 12. The third network interface 1201 is configured to receive and send signals during the process of transmitting and receiving information with other external network elements.

The third memory 1202 is configured to store a computer program capable of running on the third processor 1203.

The third processor 1203, when running the computer program, is configured to perform: sending configuration information to a transmitting end UE, wherein the configuration information is used for determining a HARQ retransmission mode of data to be transmitted.

Optionally, the configuration information includes an indication that HARQ retransmission needs to be performed for a target service or an indication that HARQ retransmission needs to be performed for a target address.

Optionally, the configuration information includes a network environment indicator threshold corresponding to a situation where HARQ retransmission needs to be performed.

Figure 13:
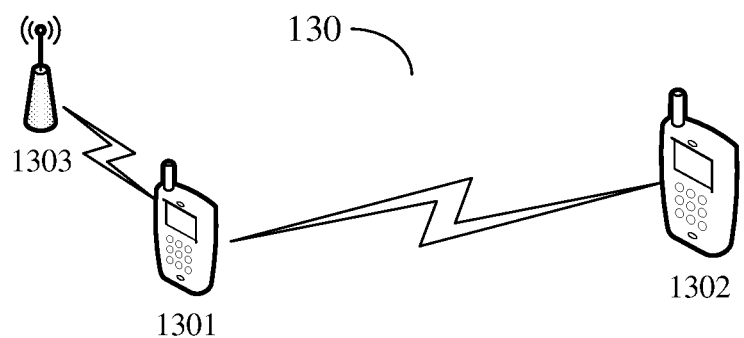
FIG. 13 is a block diagram illustrating a system for data transmission according to an embodiment of the present disclosure.

Based on the foregoing embodiment, referring to FIG. 13, a system 130 for data transmission is illustrated according to an embodiment of the present disclosure, which may include a terminal and a network side device applied in D2D, and may also be applied to a terminal and a network in V2X. The system includes a first terminal 1301, a second terminal 1302, and a network side device 1303. The first terminal 1301 may be the transmitting end UE 70 described in any of the foregoing embodiments; the second terminal 1302 may be the receiving end UE 90 described in any of the foregoing embodiments; and the network side device may be the network side device 110 described in any of the foregoing embodiments.

The above only describes the preferred embodiments of the present disclosure and is not intended to limit the scope of the present disclosure.

INDUSTRIAL APPLICABILITY

In the embodiments of the present disclosure, the HARQ retransmission mode of the data to be transmitted is determined based on the configuration information, and transmission of the data to be transmitted is performed according to the HARQ retransmission mode, so that it is not necessary to adopt HARQ retransmission for all data to be transmitted, thereby avoiding waste of channel resources, and achieving the balance between channel resource utilization and correct receiving rate of transmitted data.

What is claimed is:

1. A method for data transmission, applied to a transmitting end user equipment (UE) in a device-to-device (D2D) sidelink (SL) transmission system, the method comprising:
   acquiring configuration information from a network side device;
   determining whether a hybrid automatic repeat request (HARQ) retransmission needs to be performed based on the configuration information;
   after determining that the HARQ retransmission needs to be performed, sending, to a receiving end UE, a HARQ transmission mode of data to be transmitted through a physical sidelink control channel (PSCCH) and/or a physical sidelink shared channel (PSSCH), wherein the HARQ transmission mode comprises a first mode without requiring feedback or a second mode requiring feedback; and
   transmitting, according to the HARQ transmission mode, the data to be transmitted to the receiving end UE,
   wherein the configuration information comprises an indication with respect to a logical channel,
      the indication with respect to the logical channel comprises reliability description information on that HARQ retransmission needs to be performed for a target address or a target service, and determining whether HARQ retransmission needs to be performed based on the configuration information comprises: detecting whether reliability requirement of the data to be transmitted meets the reliability description information on that HARQ retransmission needs to be performed for a target address or a target service; determining, if yes, to perform HARQ retransmission for the data to be transmitted; and determining, if no, not to perform HARQ retransmission for the data to be transmitted, or
      the indication with respect to the logical channel comprises a network environment indicator threshold corresponding to a situation where HARQ retransmission needs to be performed, and determining whether HARQ retransmission needs to be performed based on the configuration information comprises: detecting whether a network environment indicator value when the data to be transmitted is sent exceeds the network environment indicator threshold corresponding to the situation where HARQ retransmission needs to be performed; determining, if yes, to perform HARQ retransmission for the data to be transmitted; and determining, if no, not to perform HAQR retransmission for the data to be transmitted.

2. The method according to claim 1, wherein the indication with respect to the logical channel comprises at least one of an indication that HARQ retransmission needs to be performed for a target service, or an indication that HARQ retransmission needs to be performed for a target address.

3. The method according to claim 1, wherein the indication with respect to the logical channel comprises at least one of an indication on whether HARQ retransmission needs to be performed; or an indication of reliability description information.

4. The method according to claim 1, wherein determining whether HARQ retransmission needs to be performed based on the configuration information comprises:
   detecting whether an indication that HARQ retransmission needs to be performed for a target service or an indication that HARQ retransmission needs to be performed for a target address is included in the data to be transmitted;
   determining, if yes, to perform HARQ retransmission for the data to be transmitted; and
   determining, if no, not to perform HAQR retransmission for the data to be transmitted.

5. The method according to claim 1, wherein determining whether HARQ retransmission needs to be performed based on the configuration information comprises:
   determining whether HARQ retransmission needs to be performed for the data to be transmitted according to a mapping relationship between a combination of the indication with respect to the logical channel and channel quality information and a HARQ retransmission parameter.

6. The method according to claim 1, wherein the sending, to the receiving end UE, the HARQ transmission mode of the data to be transmitted through the PSCCH comprises:
   sending, to the receiving end UE, the HARQ transmission mode of the data to be transmitted sending, to the receiving end UE, the HARQ transmission mode of the data to be transmitted through radio resource control (RRC) signaling, medium access control layer control element (MAC CE) or PC5 interface signal (PC5-S).

7. The method according to claim 1, wherein sending, to the receiving end UE, the HARQ transmission mode of the data to be transmitted through the PSCCH and/or the PSSCH comprises:
   sending, to the receiving end UE, the HARQ transmission mode of the data to be transmitted sending, to the receiving end UE, the HARQ transmission mode of the data to be transmitted through content carried by the PSCCH and/or the PSSCH;
   sending, to the receiving end UE, the HARQ transmission mode of the data to be transmitted sending, to the receiving end UE, the HARQ transmission mode of the data to be transmitted through a time and/or frequency position of the PSCCH and/or the PSSCH; or
   sending, to the receiving end UE, the HARQ transmission mode of the data to be transmitted sending, to the receiving end UE, the HARQ transmission mode of the data to be transmitted through reference signal of the PSCCH and/or the PSSCH.

8. A transmitting end user equipment (UE) in a device-to-device (D2D) sidelink (SL) transmission system, comprising a network interface, a memory, and a processor; wherein
   the network interface is configured to receive and send signals during a process of transceiving information with another external network element;
   the memory is configured to store a computer program capable of running on the processor;
   the processor, when running the computer program, is configured to:
   acquire configuration information from a network side device;
   determine whether a hybrid automatic repeat request (HARQ) retransmission needs to be performed based on the configuration information;
   after determining that the HARQ retransmission needs to be performed, send, to a receiving end UE, a HARQ transmission mode of data to be transmitted through a physical sidelink control channel (PSCCH) and/or a physical sidelink shared channel (PSSCH), wherein the HARQ transmission mode comprises a first mode without requiring feedback or a second mode requiring feedback; and transmit, according to the HARQ transmission mode, the data to be transmitted to the receiving end UE, wherein the configuration information comprises an indication with respect to a logical channel, the indication with respect to the logical channel comprises reliability description information on that HARQ retransmission needs to be performed for a target address or a target service, and the processor is specifically configured to: detect whether reliability requirement of the data to be transmitted meets the reliability description information on that HARQ retransmission needs to be performed for a target address or a target service; determine, if yes, to perform HARQ retransmission for the data to be transmitted; and determine, if no, not to perform HARQ retransmission for the data to be transmitted, or the indication with respect to the logical channel comprises a network environment indicator threshold corresponding to a situation where HARQ retransmission needs to be performed, and the processor is specifically configured to: detect whether a network environment indicator value when the data to be transmitted is sent exceeds the network environment indicator threshold corresponding to the situation where HARQ retransmission needs to be performed; determine, if yes, to perform HARQ retransmission for the data to be transmitted; and determine, if no, not to perform HAQR retransmission for the data to be transmitted.

9. A non-transitory computer storage medium storing a data transmission program, the data transmission program being executed by at least one processor to implement steps comprising:

acquiring configuration information from a network side device;

determining whether a hybrid automatic repeat request (HARQ) retransmission needs to be performed based on the configuration information;

after determining that the HARQ retransmission needs to be performed, sending, to a receiving end UE, a HARQ transmission mode of data to be transmitted through a physical sidelink control channel (PSCCH) and/or a physical sidelink shared channel (PSSCH), wherein the HARQ transmission mode comprises a first mode without requiring feedback or a second mode requiring feedback; and transmitting, according to the HARQ transmission mode, the data to be transmitted to the receiving end UE, wherein the configuration information comprises an indication with respect to a logical channel, the indication with respect to the logical channel comprises reliability description information on that HARQ retransmission needs to be performed for a target address or a target service, and determining whether HARQ retransmission needs to be performed based on the configuration information comprises: detecting whether reliability requirement of the data to be transmitted meets the reliability description information on that HARQ retransmission needs to be performed for a target address or a target service; determining, if yes, to perform HARQ retransmission for the data to be transmitted; and determining, if no, not to perform HARQ retransmission for the data to be transmitted, or the indication with respect to the logical channel comprises a network environment indicator threshold corresponding to a situation where HARQ retransmission needs to be performed, and determining whether HARQ retransmission needs to be performed based on the configuration information comprises: detecting whether a network environment indicator value when the data to be transmitted is sent exceeds the network environment indicator threshold corresponding to the situation where HARQ retransmission needs to be performed; determining, if yes, to perform HARQ retransmission for the data to be transmitted; and determining, if no, not to perform HAQR retransmission for the data to be transmitted.

10. The transmitting end UE according to claim 8, wherein the indication with respect to the logical channel comprises: an indication that HARQ retransmission needs to be performed for a target service, or an indication that HARQ retransmission needs to be performed for a target address.

11. The transmitting end UE according to claim 8, wherein the indication with respect to the logical channel comprises at least one of an indication on whether HARQ retransmission needs to be performed; or an indication of reliability description information.

\* \* \* \* \*